United States Patent
Koike et al.

(10) Patent No.: US 8,318,056 B2
(45) Date of Patent: Nov. 27, 2012

(54) OPTICAL SHEET MANUFACTURING METHOD

(75) Inventors: Makoto Koike, Fujinomiya (JP); Hideo Nagano, Fujinomiya (JP); Ryuichi Katsumoto, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 709 days.

(21) Appl. No.: 12/305,626

(22) PCT Filed: Jun. 19, 2007

(86) PCT No.: PCT/JP2007/062656
§ 371 (c)(1),
(2), (4) Date: Dec. 18, 2008

(87) PCT Pub. No.: WO2007/148815
PCT Pub. Date: Dec. 27, 2007

(65) Prior Publication Data
US 2009/0169820 A1    Jul. 2, 2009

(30) Foreign Application Priority Data
Jun. 21, 2006   (JP) ................... 2006-171497

(51) Int. Cl.
*B29D 11/00* (2006.01)
(52) U.S. Cl. .................... 264/1.6; 264/1.7; 264/2.7
(58) Field of Classification Search .......... 264/1.1, 264/1.6, 1.7, 2.7, 85
See application file for complete search history.

(56) References Cited

U.S. PATENT DOCUMENTS

| | | | |
|---|---|---|---|
| 5,600,462 A | 2/1997 | Suzuki et al. | |
| 5,945,042 A | 8/1999 | Mimura et al. | |
| 2005/0039788 A1 | 2/2005 | Blieske et al. | |
| 2010/0062217 A1* | 3/2010 | Kurematsu | 428/141 |

FOREIGN PATENT DOCUMENTS

| | | |
|---|---|---|
| JP | 5-173134 A | 7/1993 |
| JP | 6-109925 A | 4/1994 |
| JP | 7-239472 A | 9/1995 |
| JP | 8 271888 | 10/1996 |
| JP | 8-271888 A | 10/1996 |
| JP | 2001 166113 | 6/2001 |
| JP | 2001-166113 A | 6/2001 |
| JP | 2001 272683 | 10/2001 |
| JP | 2001-272683 A | 10/2001 |
| JP | 2004-184575 A | 7/2004 |
| WO | WO 2007/034715 * | 3/2007 |

* cited by examiner

*Primary Examiner* — Mathieu D. Vargot
(74) *Attorney, Agent, or Firm* — Birch, Stewart, Kolasch & Birch, LLP

(57) ABSTRACT

An optical sheet having both a light condensing function and a light diffusing function in a single sheet is to be provided. When a transparent support (18) on which a curable resin coat layer (38) is formed is wound around a zigzag-faced roller (32) on which the reversed pattern of convex-concave patterns is formed to transfer the reversed pattern of the zigzag-faced roller (32) to the resin coat layer (38), gas is blown from a gas jet nozzle (50), immediately before winding the transparent support (18) around the zigzag-faced roller (32), into a gap between the resin coat layer (38) and the surface of the zigzag-faced roller.

2 Claims, 13 Drawing Sheets

FIG.13

| | FRONT LUMINANCE | LIGHT DIFFUSION | SIDELOBES | OPTICAL INTERFERENCE FRINGES |
|---|---|---|---|---|
| IMPLEMENTATION EXAMPLE 1 | MEDIUM | HIGH | INCONSPICUOUS | INCONSPICUOUS |
| IMPLEMENTATION EXAMPLE 2 | MEDIUM | HIGH | INCONSPICUOUS | INCONSPICUOUS |
| IMPLEMENTATION EXAMPLE 3 | MEDIUM | HIGH | INCONSPICUOUS | NONE |
| IMPLEMENTATION EXAMPLE 4 | MEDIUM | HIGH | INCONSPICUOUS | NONE |
| IMPLEMENTATION EXAMPLE 5 | MEDIUM | HIGH | INCONSPICUOUS | NONE |
| COMPANY A'S PRODUCT 1 | HIGH | LOW | CONSPICUOUS | CONSPICUOUS |
| COMPANY A'S PRODUCT 2 | LOW | LOW | INCONSPICUOUS | CONSPICUOUS |

OPTICAL SHEET MANUFACTURING METHOD

TECHNICAL FIELD

The present invention relates to an optical sheet and a manufacturing method thereof, and more particularly, to an optical sheet for display for use in a liquid crystal display element, having both a light condensing function and a light diffusing function, and a manufacturing method thereof.

BACKGROUND ART

Today, optical sheets such as light diffusing sheets for diffusing a light from a source such as a light guiding panel and light condensing sheet (lens sheets) for condensing lights in the forward direction are used for electronic display applications such as liquid crystal display elements and organic EL displays. In many such cases, various optical sheets are stacked one over another. Japanese Patent Application Laid-Open No. 2004-184575, for instance, proposes a semi-transmissive/semi-reflective polarizing film formed by stacking a reflective polarizing sheet, a phase difference sheet and a semi-transmissive/semi-reflective layer in any desired order and further stacking absorptive polarizing sheets outside these three layers. As many as five sheets intervene between the light source device and liquid crystal cells, and this configuration is claimed to help enhance the screen luminance or reduce power consumption.

Japanese Patent Application Laid-Open No. 5-173134 discloses a light control sheet integrating both the light condensing function and the light diffusing function by stacking a light diffusing sheet and a light condensing sheet.

Japanese Patent Application Laid-Open No. 6-109925 describes increasing the luminance within the visual angle of the LCD device by the use of an optical film having a first surface which has a corrugated structure having a plurality of isosceles triangular prisms, arranged side by side, and a second surface having an optical convex-concave face which diffuses and transmits light. Japanese Patent Application Laid-Open No. 7-239472 discloses a film lens for area light source representing an attempt to enhance the luminance in the normal direction and uniformize the luminance distribution by appropriately designing the shape of the film lens on the output side of the area light source. Thus, luminance improvement and uniformization are also sought by a shape-oriented approach.

DISCLOSURE OF THE INVENTION

However, any conventional optical film which has both the light condensing function and the light diffusing function is formed by stacking a light diffusing sheet and a light condensing sheet one over the other, and therefore requires a stacking step of stacking the manufactured light condensing sheet and light diffusing sheet and the sticking step of making the stacked sheets firmly adhere to each other besides individually manufacturing the light condensing sheet and the light diffusing sheet, resulting in a problem of requiring extra steps. The extra steps mean the need for a correspondingly longer production line and larger installation space.

Furthermore, the recent trend of favoring thinner liquid crystal display devices necessitates minimization of the optical film thickness, but stacking a light condensing sheet and a light diffusing sheet does not meet this necessity.

Because of these background circumstances, if an optical sheet combining a light condensing function and a light diffusing function can be manufactured in a single sheet instead of stacking separate optical sheets, not only can the number of manufacturing steps be substantially reduced but also can the thinning of the optical film be greatly advanced.

An object of the present invention, attempted in view of these requirements, is to provide an optical sheet which can combine both a light condensing function and a light diffusing function in a single sheet and therefore permits a substantial reduction in the number of manufacturing steps a contribution to reducing the thickness of the film, and a manufacturing method therefore.

In order to achieve the object stated above, the present invention in its first aspect provides an optical sheet having both a light condensing function and a light diffusing function, characterized in that a plurality of micro-dimples are formed in the convex-concave face of a resin sheet having minute convex-concave patterns provided thereon.

The optical sheet according to the first aspect of the invention, as it has a plurality of micro-dimples formed in the convex-concave face of a resin sheet in which minute convex-concave patterns are provided all over, can exert a light condensing function by the convex-concave patterns and a light diffusing function by the micro-dimples.

Since this configuration enables a single sheet to have both a light condensing function and a light diffusing function, the number of manufacturing steps can be substantially reduced and contributions made to reducing the thickness of the film.

The convex-concave face of the convex-concave pattern here means an uneven continuous face on which convexes and concaves are formed consecutively. Regarding the formation of a plurality of micro-dimples in the convex-concave face, the plurality of micro-dimples can be formed in any part of the uneven continuous face, whether at the vertexes of the convexes, on the slopes of the convexes or elsewhere. The greater the number of micro-dimples, the easier for the optical sheet to exert its light diffusing function.

A second aspect of the invention is characterized in that the micro-dimples in the first aspect are smaller than the convexes and concaves of the convex-concave patterns.

The second aspect prescribes a preferable size of the micro-dimples, whose size preferably may be smaller than the minute convexes and concaves of the convex-concave patterns. This is because, if the micro-dimples were greater than the convex-concave patterns, even the essential shape of the convex-concave patterns for exerting their light condensing function might be destroyed and invite a drop in light condensing function. The preferable size ranges of the micro-dimples are, for instance, 1 to 10 μm in bore and 1 to 10 μm in depth.

A third aspect of the invention is characterized in that the convex-concave patterns in the first or second aspect are formed of convex quadrangular pyramids provided in a grid state and have micro-dimples at the vertexes of the convex quadrangular pyramids.

The third aspect prescribes a preferable shape of the convex-concave patterns and a preferable position of the formation of the micro-dimples, and the convex-concave patterns formed of convex quadrangular pyramids provided in a grid state serve to reduce sidelobes. The reason for positioning the micro-dimples at the vertexes of the convex quadrangular pyramids is that implementation of a method for manufacturing optical sheets in a ninth aspect of the invention to be described afterwards readily permits formation of micro-dimples at the vertexes of the convex quadrangular pyramids. In this case, the convex-concave patterns on the surface of a zigzag-faced roller are concave quadrangular pyramids resulting from the reversal of convex quadrangular pyramids transferred onto the optical sheet.

The sidelobes here refer, where the luminance is at its highest at an angle of view of 0° and falls as the angle of view becomes wider, to the convex parts where the luminance after the fall temporarily rise before both ends of the angle of view.

A fourth aspect of the invention is characterized in that the convex-concave patterns in the first or second aspect are formed of concave quadrangular pyramids provided in a grid state and have micro-dimples in the edge lines of the concave quadrangular pyramids.

The fourth aspect prescribes a preferable shape of the convex-concave patterns and a preferable position of the formation of the micro-dimples, and the convex-concave patterns formed of concave quadrangular pyramids provided in a grid state serve to reduce sidelobes. The reason for positioning the micro-dimples in the edge lines of the concave quadrangular pyramids is that implementation of a method for manufacturing optical sheets in a ninth aspect of the invention to be described afterwards readily permits formation of micro-dimples in the edge lines of the concave quadrangular pyramids. In this case, the convex-concave patterns on the surface of the zigzag-faced roller are convex quadrangular pyramids resulting from the reversal of concave quadrangular pyramids transferred onto the optical sheet.

A fifth aspect of the invention is characterized in that, in any of the first to fourth aspects, the arraying of the convex-concave patterns involves irregularity.

Irregularity in the arraying of the convex-concave patterns formed on the optical sheet in the fifth aspect of the invention gives an optical sheet free from optical interference fringes. Therefore, the optical sheet according to the invention has both a light condensing function and a light diffusing function, and moreover has high quality free from optical interference fringes. The irregularity in the arraying of convex-concave patterns means random arraying of the convex quadrangular pyramids or the concave quadrangular pyramids instead of their arraying in regular (linear) grids. Random arraying may include, for instance, meandering of the longitudinal and/or lateral lines of the grids.

A sixth aspect of the invention is characterized in that, in any of the first to fifth aspects, the height of the convex-concave patterns involves irregularity.

Irregularity in the height of the convex-concave patterns formed on the optical sheet in the sixth aspect of the invention gives an optical sheet free from optical interference fringes. Therefore, the optical sheet according to the invention has both a light condensing function and a light diffusing function, and moreover has high quality free from optical interference fringes. The irregularity in the height of convex-concave pattern means that the height of the convex quadrangular pyramids or the depth of the concave quadrangular pyramids is random. Both the arraying and the height may be irregular.

A seventh aspect of the invention is characterized in that, in any of the first to sixth aspects, the pitch of the convex-concave patterns involves irregularity.

Irregularity in the pitch of the convex-concave patterns formed on the optical sheet in the seventh aspect of the invention gives an optical sheet free from optical interference fringes. Therefore, the optical sheet according to the invention has both a light condensing function and a light diffusing function, and moreover has high quality free from optical interference fringes. The irregularity in the pitch of convex-concave pattern means, for instance, that the distance between the vertexes of the convex quadrangular pyramids or that between the deepest parts of the concave quadrangular pyramids is random.

In order to achieve the object stated above, the invention in its eighth aspect provides a method for manufacturing optical sheets having both a light condensing function and a light diffusing function, characterized in that the method includes a micro-dimple formation step of forming a plurality of micro-dimples in the convex-concave face of a resin sheet in which minute convex-concave patterns are provided all over.

According to the eighth aspect of the invention, since a plurality of micro-dimples are formed in the convex-concave face of a resin sheet having minute convex-concave patterns provided thereon, optical sheets each of which has both a light condensing function and a light diffusing function in a single sheet can be manufactured.

In order to achieve the object stated above, the invention in its ninth aspect provides a method for manufacturing optical sheets having both a light condensing function and a light diffusing function, characterized by comprising: a liquid application step of consecutively applying a liquid of curable resin onto a web-form transparent support which is being carried to form a resin coat layer; a transfer step of winding the transparent support on which the resin coat layer is formed around a rotating zigzag-faced roller thereby to transfer convex-concave patterns on the surface of the zigzag-faced roller onto to the resin coat layer; a curing step of curing, in a state in which the transparent support is wound around the zigzag-faced roller, the resin coat layer to which the convex-concave patterns have been transferred; a peeling step of peeling the transparent support having the resin coat layer off the zigzag-faced roller; and a blow-in step of blowing in gas, immediately before winding the transparent support around the zigzag-faced roller, into a gap between the resin coat layer and the surface of the zigzag-faced roller.

The ninth aspect of the invention provides a method for easily forming micro-dimples in the convex-concave face of a resin sheet in which minute convex-concave patterns are provided all over when manufacturing an optical sheet having both a light condensing function and a light diffusing function.

According to the invention, when the transparent support on which the curable resin coat layer is formed is wound around the zigzag-faced roller on which the reversed pattern of the convex-concave pattern is formed to transfer the reversed pattern of the zigzag-faced roller to the resin coat layer, gas is blown immediately before winding the transparent support around the zigzag-faced roller into a gap between the resin coat layer and the surface of the zigzag-faced roller. This causes most of the gas (including air) having accumulated in the concave parts in the zigzag-faced roller to be excluded when the transparent supporting sheet is wound around the zigzag-faced roller, but the gas having accumulated in the deepest parts of the concaves remains unexcluded when the transfer step is performed.

As a result, when the transfer step is performed to form convex quadrangular pyramids on the resin coat layer, micro-dimples are formed at the vertexes of the convex quadrangular pyramids (matching the deepest parts of the reversed concave quadrangular pyramids formed in the zigzag-faced roller). Or when the transfer step is performed to form concave quadrangular pyramids on the resin coat layer, micro-dimples are formed in the edge lines of the concave quadrangular pyramids (matching the deepest parts of the reversed convex quadrangular pyramids formed on the zigzag-faced roller).

Therefore, by implementing the manufacturing method in the ninth aspect, the micro-dimples can be easily formed in a simple process of blowing gas immediately before winding the transparent support around the zigzag-faced roller into the gap between the resin coat layer and the surface of the zigzag-faced roller. Further, as the micro-dimples are formed at the same time as the transfer of the convex-concave patterns to the resin coat layer, the process of manufacturing optical sheets having both a light condensing function and a light diffusing function can be simplified.

A tenth aspect of the invention is characterized in that, in the ninth aspect, the convex-concave patterns to be transferred to the resin coat layer are convex quadrangular pyramids or concave quadrangular pyramids.

The tenth aspect provides even more desirable quality for the optical sheet because the occurrence of sidelobes can be prevented by forming the convex-concave patterns to be transferred to the resin coat layer by the manufacturing method of the ninth aspect as convex quadrangular pyramids or concave quadrangular pyramids.

In order to achieve the object stated above, the invention in its eleventh aspect provides a manufacturing apparatus for optical sheets having both a light condensing function and a light diffusing function, characterized in that the apparatus includes a liquid application device of consecutively applying a liquid of curable resin onto a web-form transparent support which is being carried to form a resin coat layer; a transfer device of winding the transparent support on which the resin coat layer is formed around a rotating zigzag-faced roller thereby to transfer convex-concave patterns on the surface of the zigzag-faced roller onto the resin coat layer; a curing device of curing, in a state in which the transparent support is wound around the zigzag-faced roller, the resin coat layer to which the convex-concave patterns have been transferred; a peeling device of peeling the cured transparent support having the cured resin coat layer off the zigzag-faced roller; and a blow-in device of blowing in gas, immediately before winding the transparent support around the zigzag-faced roller, into a gap between the resin coat layer and the surface of the zigzag-faced roller.

The eleventh aspects provides an a manufacturing apparatus for optical sheets having both a light condensing function and a light diffusing function configured according to the invention.

As described above, the optical sheet according to the present invention and the manufacturing method therefor enable a single sheet to have both a light condensing function and a light diffusing function, thereby enabling the number of manufacturing steps to be substantially reduced and contributing to thinning the film.

BRIEF DESCRIPTION OF THE DRAWINGS

FIG. 13 shows a table of implementation examples of the optical sheet according to the invention.

DESCRIPTION OF SYMBOLS

10 . . . Optical sheet, 12 . . . Resin sheet, 14 . . . Convex-concave pattern, 14A . . . Convex quadrangular pyramid, 14B . . . Concave quadrangular pyramid, 16 . . . Micro-dimples, 18 . . . Transparent support, 30 . . . Optical sheet manufacturing apparatus, 32 . . . Zigzag-faced roller, 34 . . . Delivering device, 36 . . . Application device, 38 . . . Resin coat layer, 40 . . . Curing device, 42 . . . Nip roller, 44 . . . UV irradiator, 46 . . . Peeling roller, 48 . . . Take-up device, 50 . . . Gas jet nozzle

BEST MODES FOR CARRYING OUT THE INVENTION

The optical sheet and the manufacturing method therefor in embodiments of the present invention will be described below with reference to the accompanying drawings.

An optical sheet 10 according to the invention is configured by forming a plurality of micro-dimples 16 in the convex-concave face of a resin sheet 12 all over which fine convex-concave patterns 14 are provided, and the embodiments described below (first to fourth) can be preferably used. Although the preferable form of the convex-concave patterns 14 will be described below with reference to convex quadrangular pyramids 14A and concave quadrangular pyramids 14B, but this is not the only preferable form. For instance, convex triangular pyramids and concave triangular pyramids or other convex and concave shapes may be used as well.

Figure 1:
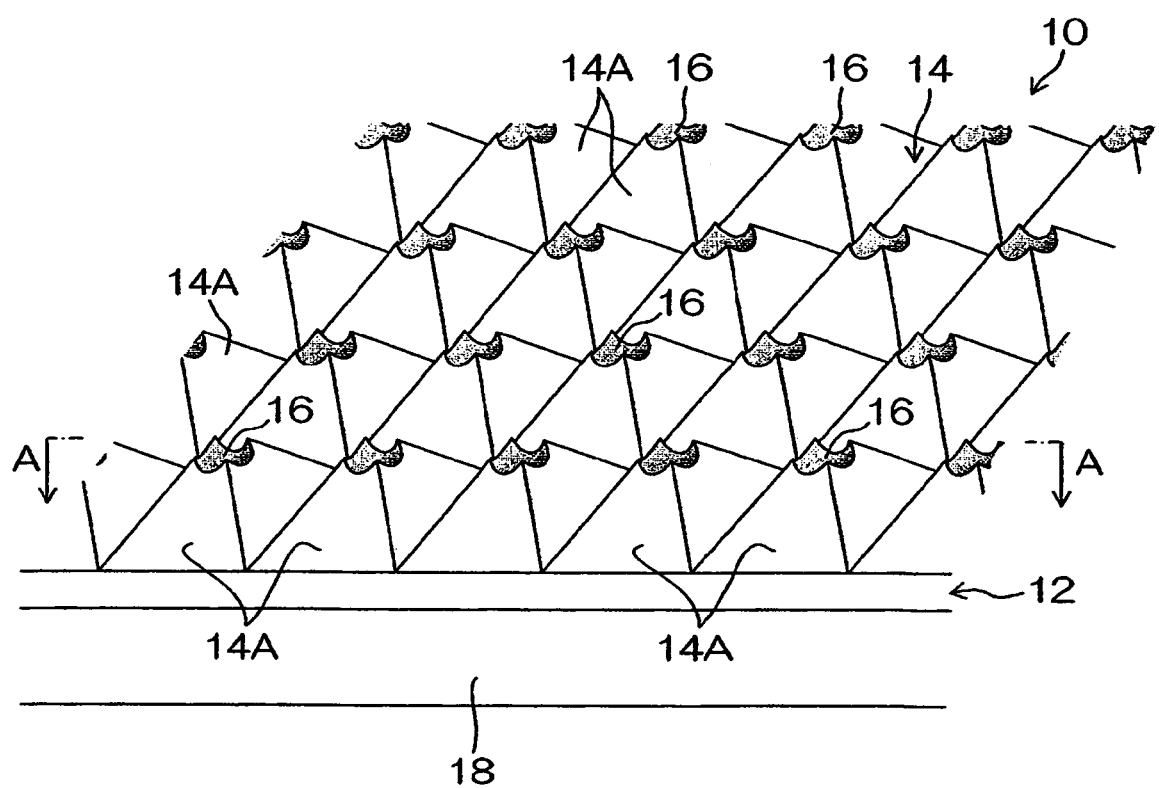
FIG. 1 shows a perspective view of an optical sheet in a first embodiment of the invention.
Figure 2:
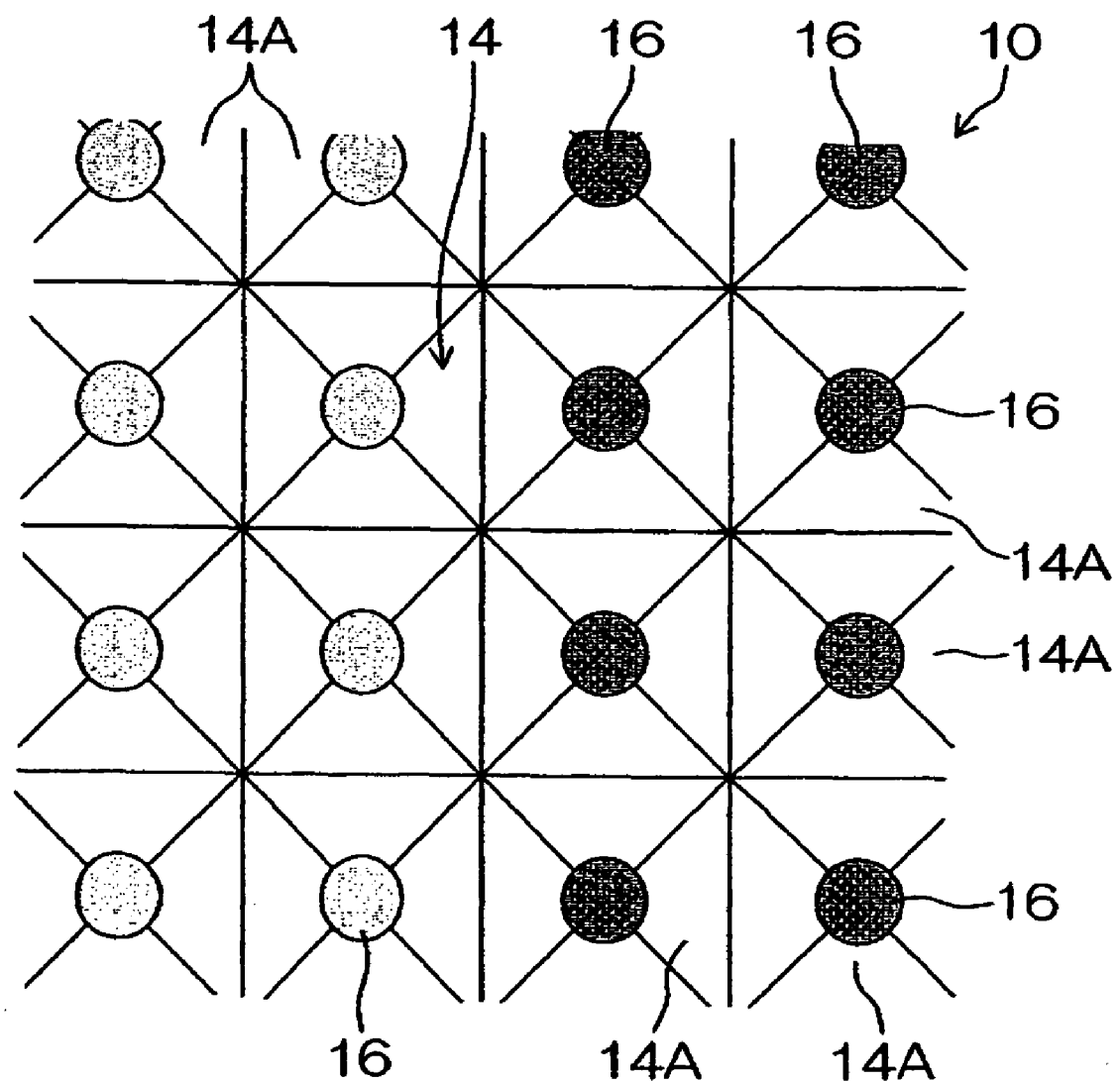
FIG. 2 shows a top view of the optical sheet in the first embodiment of the invention.
Figure 3:
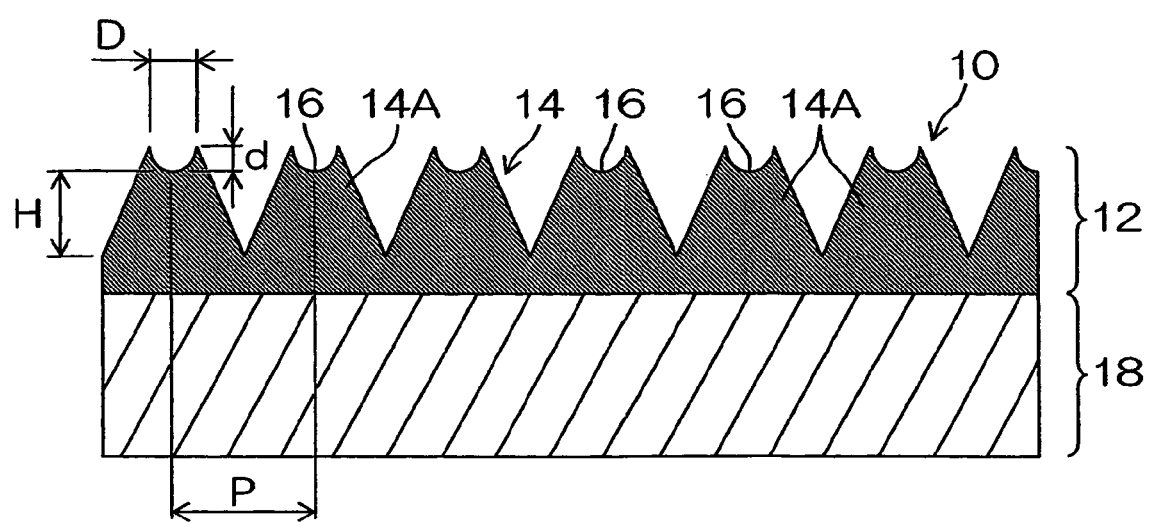
FIG. 3 shows a side section of the optical sheet in the first embodiment of the invention.

FIG. 1 to FIG. 3 show the optical sheet 10 in the first embodiment of the invention, in which convex quadrangular pyramids 14A constitute the convex-concave patterns 14 to be formed over a transparent support 18. FIG. 1 shows a perspective view; FIG. 2, a top view; and FIG. 3 a section along line A-A in FIG. 1.

As shown in FIG. 1 to FIG. 3, the optical sheet 10 in the first embodiment has convex quadrangular pyramids 14A formed in a grid state substantially all over its surface and micro-dimples 16 formed at the vertexes of the convex quadrangular pyramids 14A. Preferable dimensional ranges of the convex quadrangular pyramids 14A are, for instance, 10 to 100 μm in pitch P and 5 to 95 μm in height H (height from the deepest part of the micro-dimples 16) (see FIG. 3). In this case, the bottom shape of the convex quadrangular pyramids 14A may be any of square, rectangle and rhombus. It is preferable for the micro-dimples 16 to be smaller in size than the convex quadrangular pyramids 14A, for instance between 1 to 10 μm in bore D and 1 to 10 μm in depth d (see FIG. 3). The optical sheet 10 in the first embodiment having such a configuration is enabled by the arraying of the convex quadrangular pyramids 14A in a grid state to exert a light condensing function and by the micro-dimples 16 to exert a light diffusing function. This enables a single sheet to have both the light condensing function and the light diffusing function. The convex-concave patterns 14 composed of the convex quadrangular pyramids 14A enables the occurrence of sidelobes to be prevented.

Figure 4:
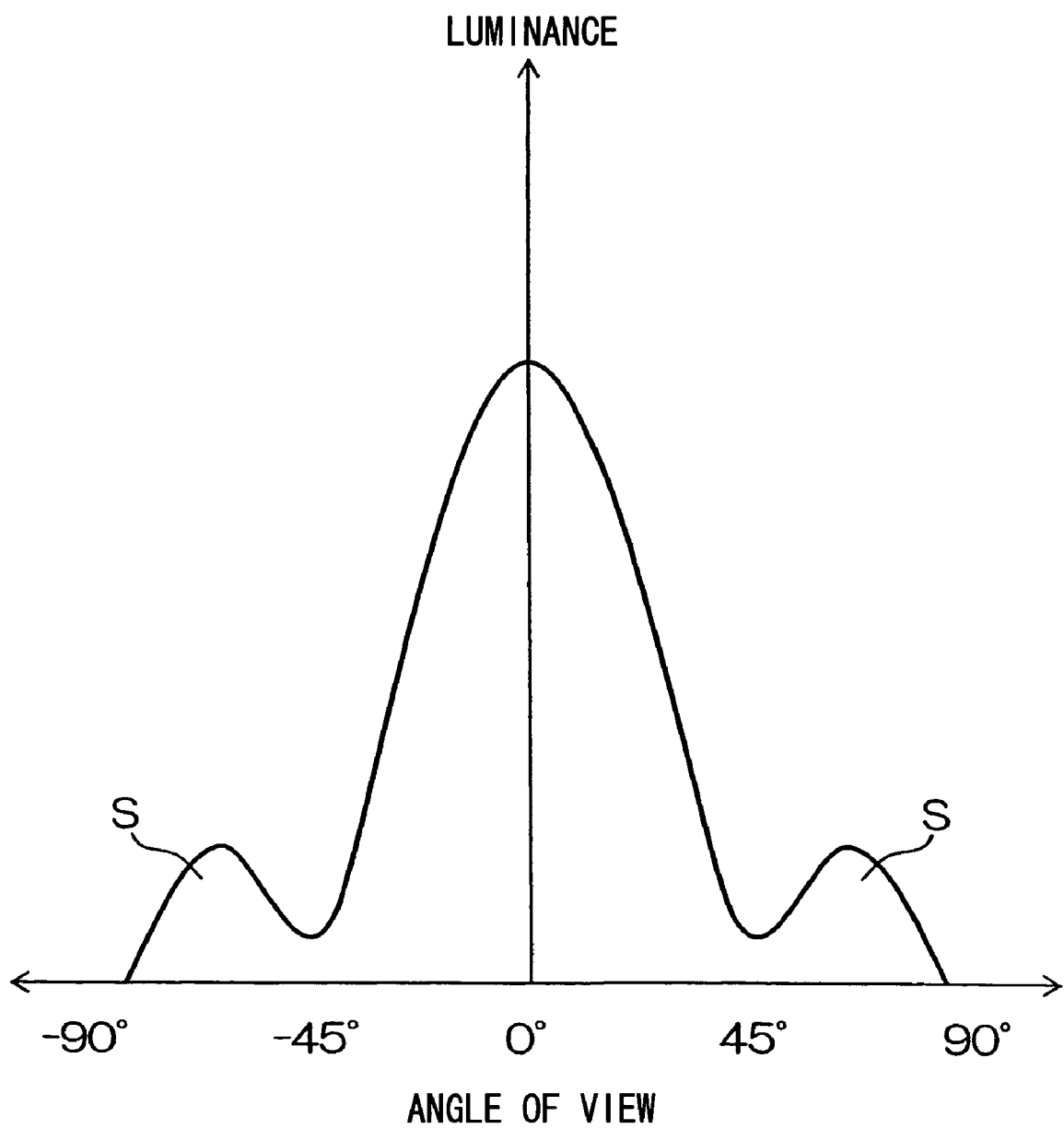
FIG. 4 illustrates sidelobes.

The sidelobes refer, where the luminance is at its highest at an angle of view of 0° and falls as the angle of view becomes wider as shown in FIG. 4, to the convex parts S immediately before −90° and +90° in angle of view where the luminance temporarily rise.

Figure 5:
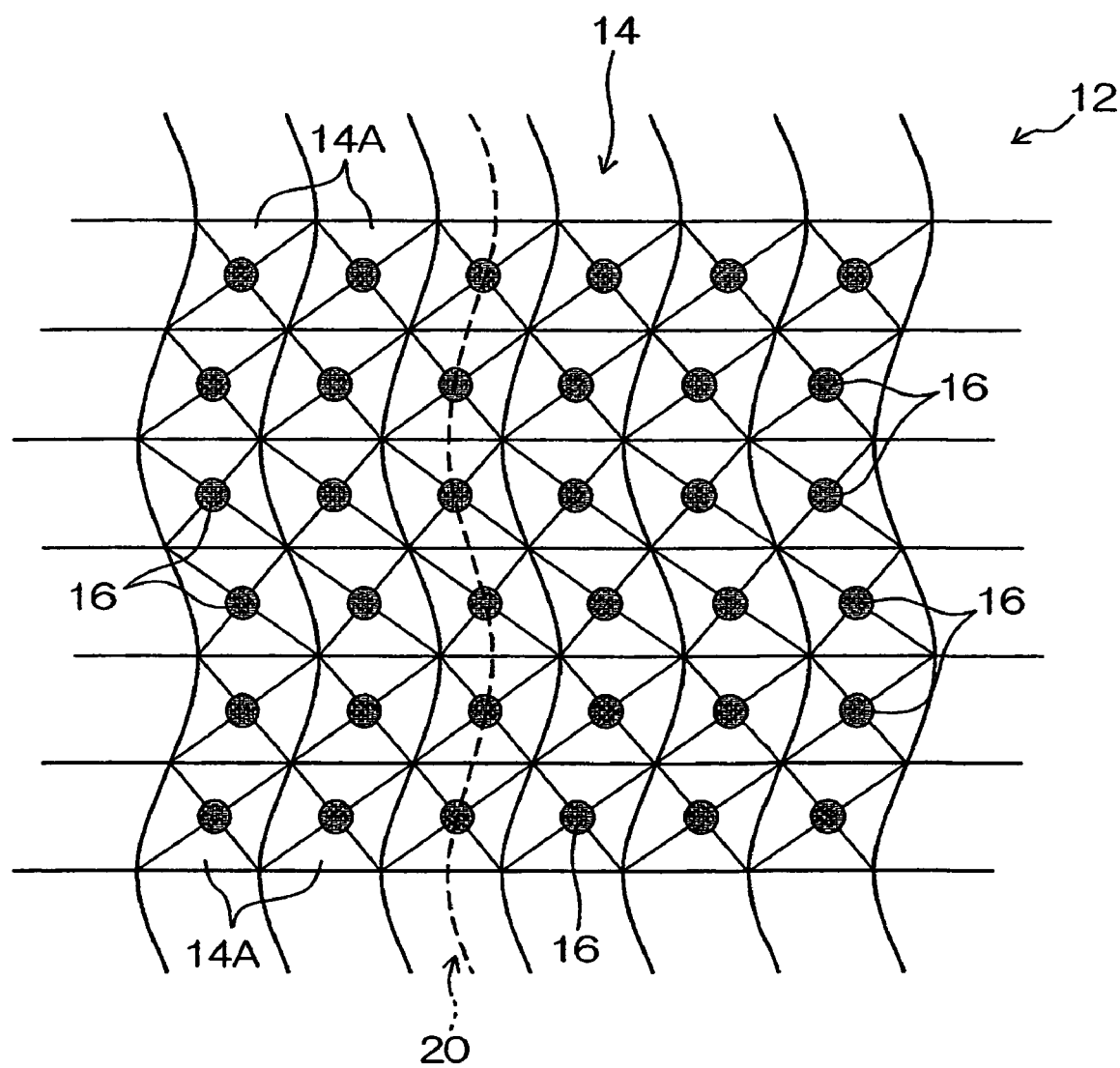
FIG. 5 shows a top view of the optical sheet in the first embodiment of the invention wherein the arraying is made irregular.
Figure 6:
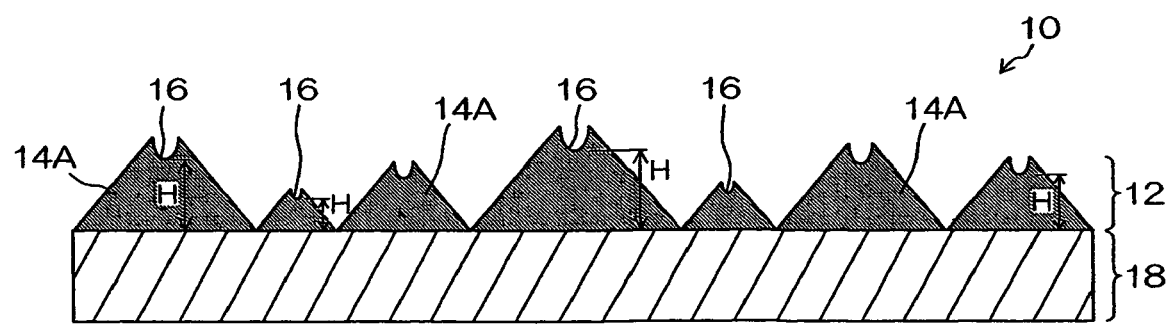
FIG. 6 shows a side section of the optical sheet in the first embodiment of the invention wherein the height is made irregular.
Figure 7:
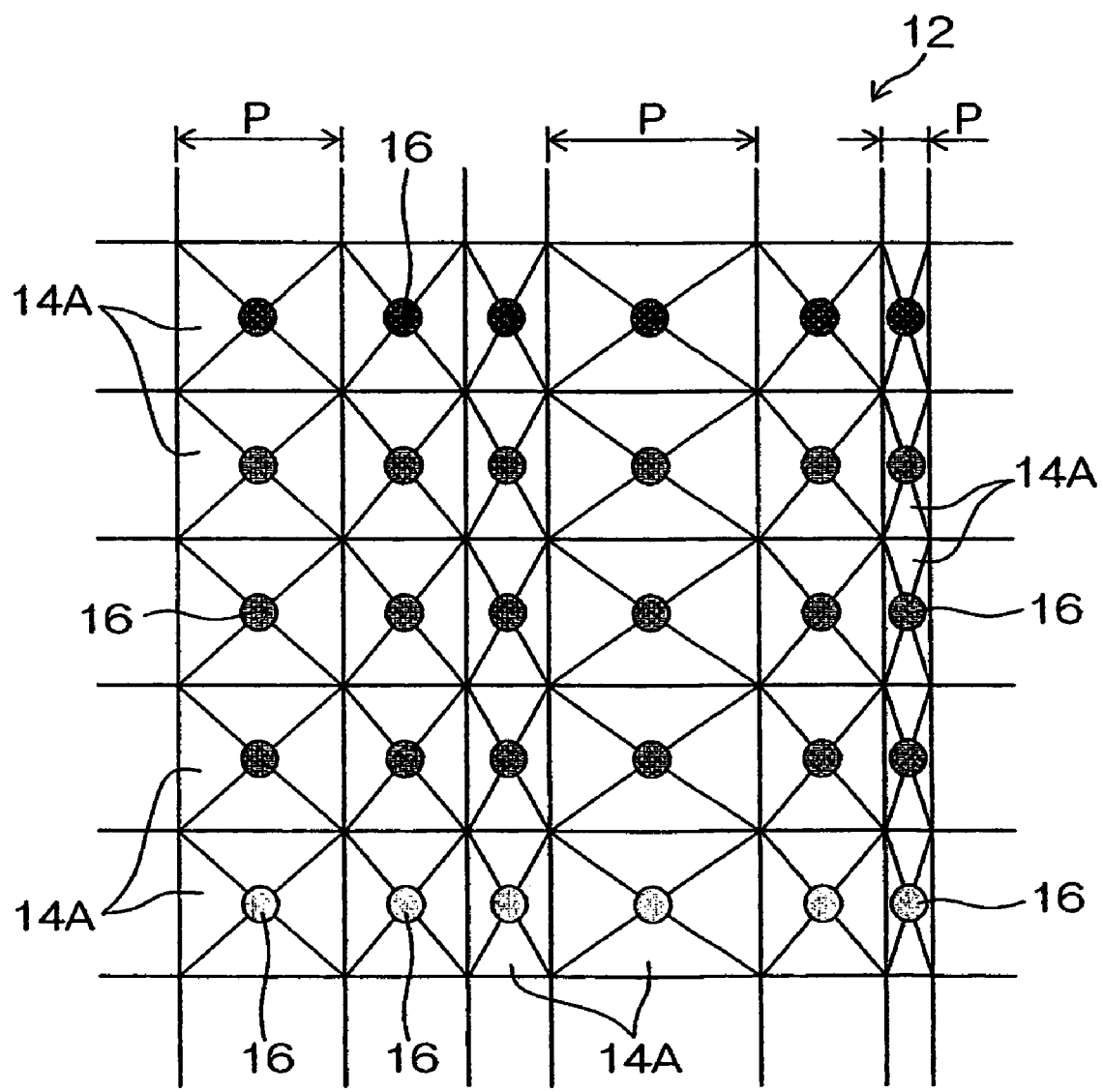
FIG. 7 shows a side section of the optical sheet in the first embodiment of the invention wherein the pitch is made irregular.

It is preferable for the convex quadrangular pyramids 14A to be provided irregularly in a grid state unlike as shown in FIG. 2 where the convex quadrangular pyramids 14A form linear grids of longitudinal and lateral lines. The longitudinal and lateral lines of the convex quadrangular pyramids 14A here mean the longitudinal and lateral lines linking the vertexes of the convex quadrangular pyramids 14A in FIG. 2 in a hypothetical case in which there are no micro-dimples 16. By making the arraying of the convex quadrangular pyramids 14A irregular (random) in this way, the optical sheet 10 free from optical interference fringes can be obtained. FIG. 5 shows, as an example of irregularity, the longitudinal rows 20 of the convex quadrangular pyramids 14A are meandering instead of being straight. The optical sheet is also free from optical interference fringes where the height H of the convex quadrangular pyramids 14A is irregular (random) as shown in FIG. 6 or where the pitch P of the convex quadrangular pyramids 14A is irregular (random) as shown in FIG. 7. Further, the arraying, height H and pitch P of the convex quadrangular pyramids can all be made irregular (random).

Figure 8:
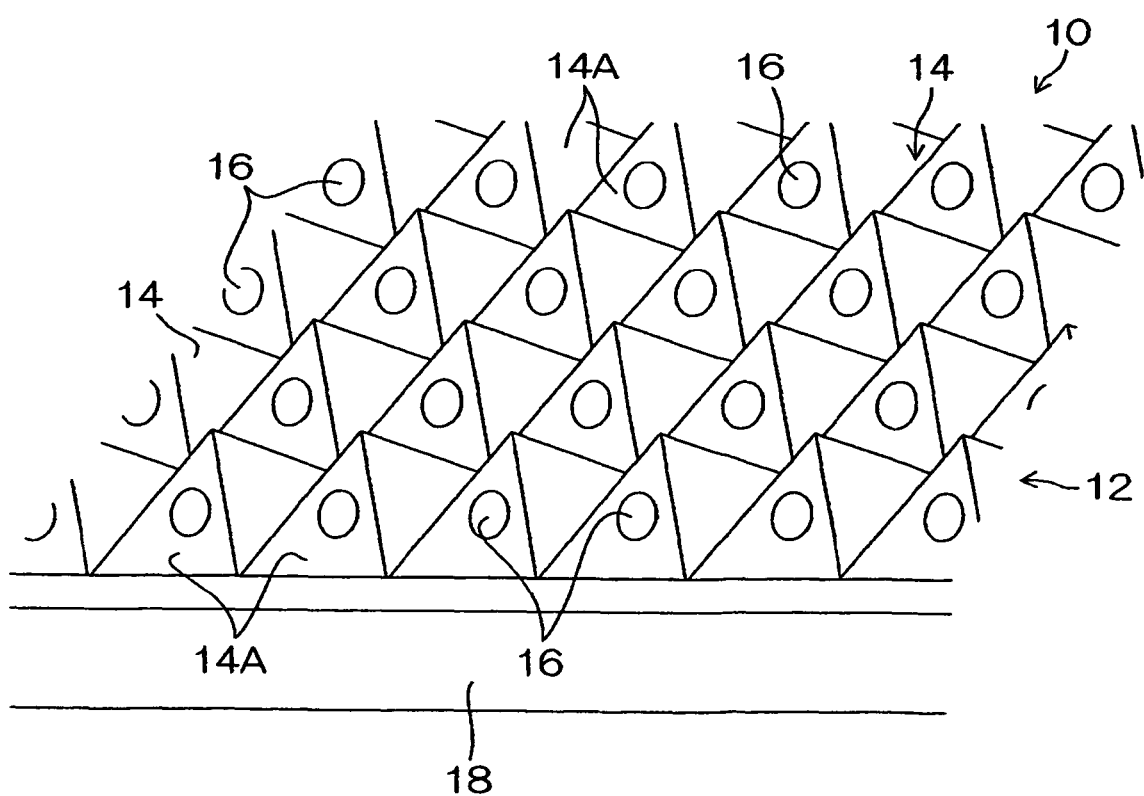
FIG. 8 shows a perspective view of an optical sheet in a second embodiment of the invention.

FIG. 8 shows an optical sheet 10 in a second embodiment of the invention. Although it is similar to the first embodiment in that convex quadrangular pyramids 14A are formed as the convex-concave patterns 14 over the transparent support 18, in this case the micro-dimples 16 are formed on the slopes of the convex quadrangular pyramids 14A. In this second embodiment, too, it is preferable to make at least one of the arraying, height H and pitch P of the convex quadrangular pyramids 14A to be made irregular (random).

This optical sheet 10 in the second embodiment can give a similar effect to the optical sheet in the first embodiment.

Although one micro-dimple 16 is formed for one convex quadrangular pyramid 14A in the configurations shown in FIG. 1 to FIG. 3 and FIG. 5 to FIG. 8, a plurality of micro-dimples 16 may as well be formed for one convex quadrangular pyramid 14A or one micro-dimple 16 may be formed for a plurality of convex quadrangular pyramids 14A. Where a plurality of micro-dimples 16 are to be formed for one convex quadrangular pyramid 14A, it is preferable for one of them to be formed at the vertex of the convex quadrangular pyramid 14A as in the first embodiment and the others to be formed on the slopes of the convex quadrangular pyramids 14A as in the second embodiment. Although the micro-dimples 16 here are semispherically shaped, there is no limitation to the shape of the micro-dimples 16. Further, the bore D and the depth d of the micro-dimples 16 need not be the same for all.

Further, though the micro-dimples 16 are formed in the same side faces out of the four slopes constituting the convex quadrangular pyramids 14A in the configuration shown in FIG. 8, they may as well be formed in different faces.

Figure 9:
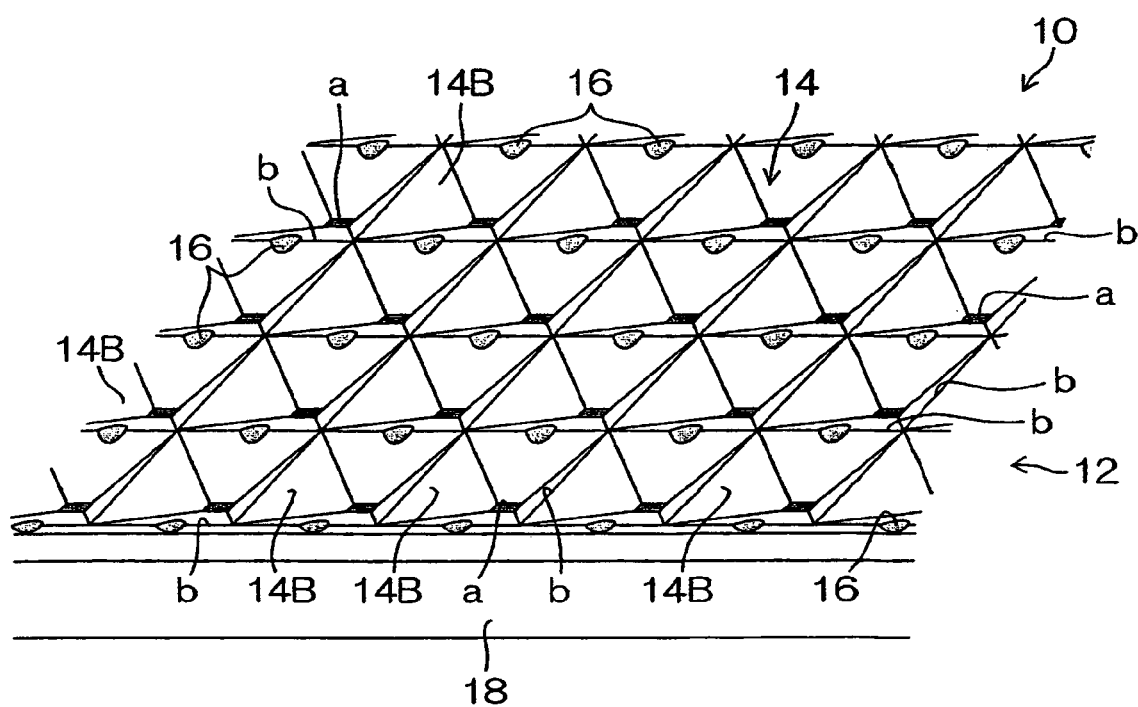
FIG. 9 shows a perspective view of an optical sheet in a third embodiment of the invention.
Figure 10:
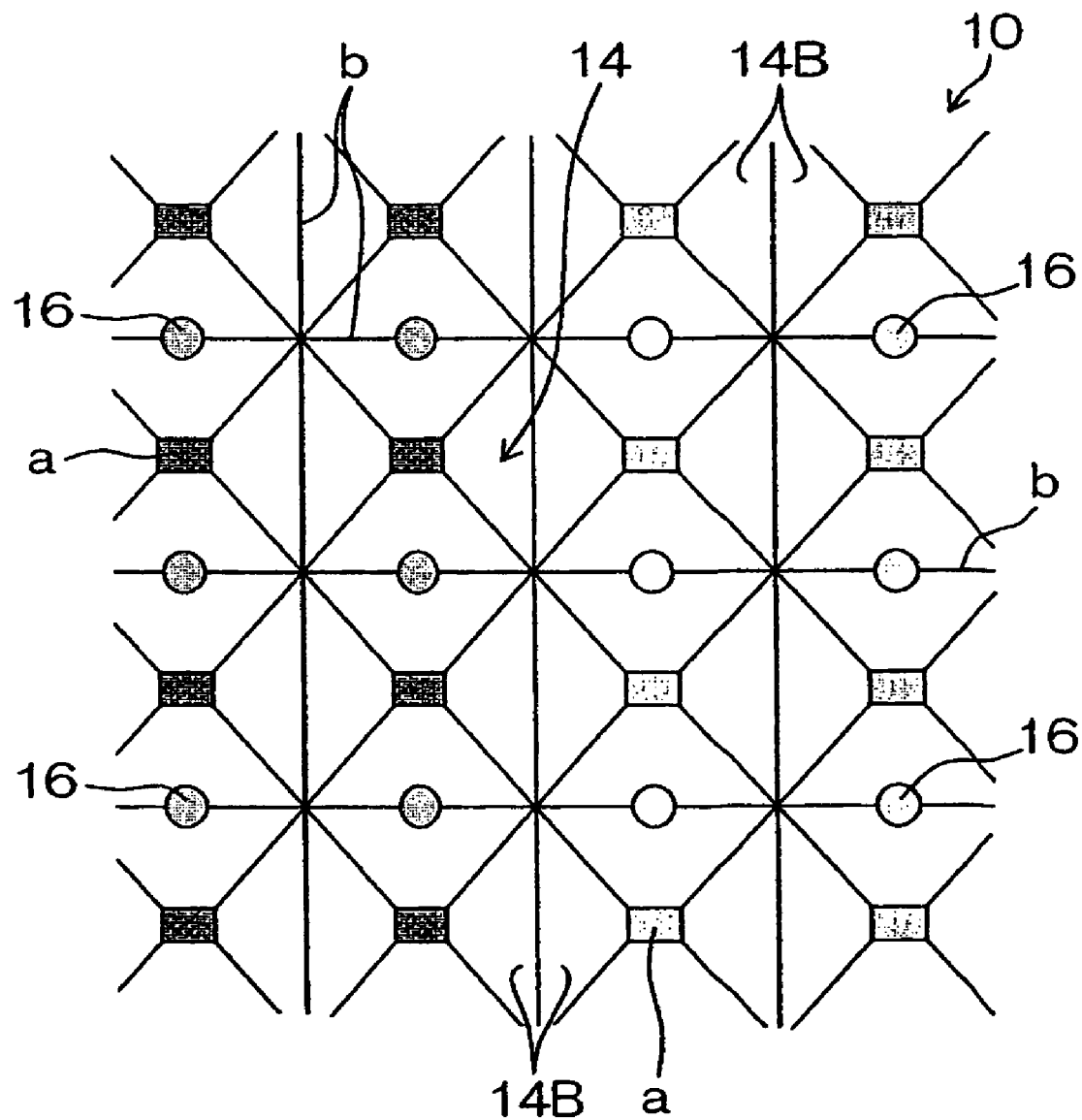
FIG. 10 shows a top view of the optical sheet in the third embodiment of the invention.

FIG. 9 and FIG. 10 show an optical sheet 10 in a third embodiment of the invention, wherein concave quadrangular pyramids 14B constitute the convex-concave patterns 14 to be formed over the transparent support 18. FIG. 9 shows a perspective view, and FIG. 10 shows a top view. Further in FIG. 9 and FIG. 10, in order to make the concave shape of the concave quadrangular pyramids 14B distinct, their deepest parts are expressed in black rectangles.

As shown in FIG. 9 and FIG. 10, concave quadrangular pyramids 14B are formed substantially all over the surface of the optical sheet 10 and micro-dimples are formed in the edge lines b of the concave quadrangular pyramids 14B in the third embodiment. Since the concave quadrangular pyramids 14B have a reversed shape of the convex quadrangular pyramids 14A, it is preferable for their pitch P and the concave depth H (corresponding to the height of the convex quadrangular pyramids) to be also in the same ranges as the convex quadrangular pyramids 14A. In this configuration, the shape of the space surrounded by the four edge lines b of the top face of the concave quadrangular pyramid 14B may be any of square, rectangle and rhombus. It is preferable for the size the micro-dimples 16 to be smaller than the concave quadrangular pyramid 14B and in substantially the same range as the convex quadrangular pyramids 14A.

The optical sheet 10 having such a configuration is enabled by the arraying of the concave quadrangular pyramids 14B to exert a light condensing function and by the micro-dimples 16 to exert a light diffusing function. This enables a single sheet to have both the light condensing function and the light diffusing function. The convex-concave patterns 14 composed of the concave quadrangular pyramids 14B enables the occurrence of sidelobes to be prevented.

Figure 11:
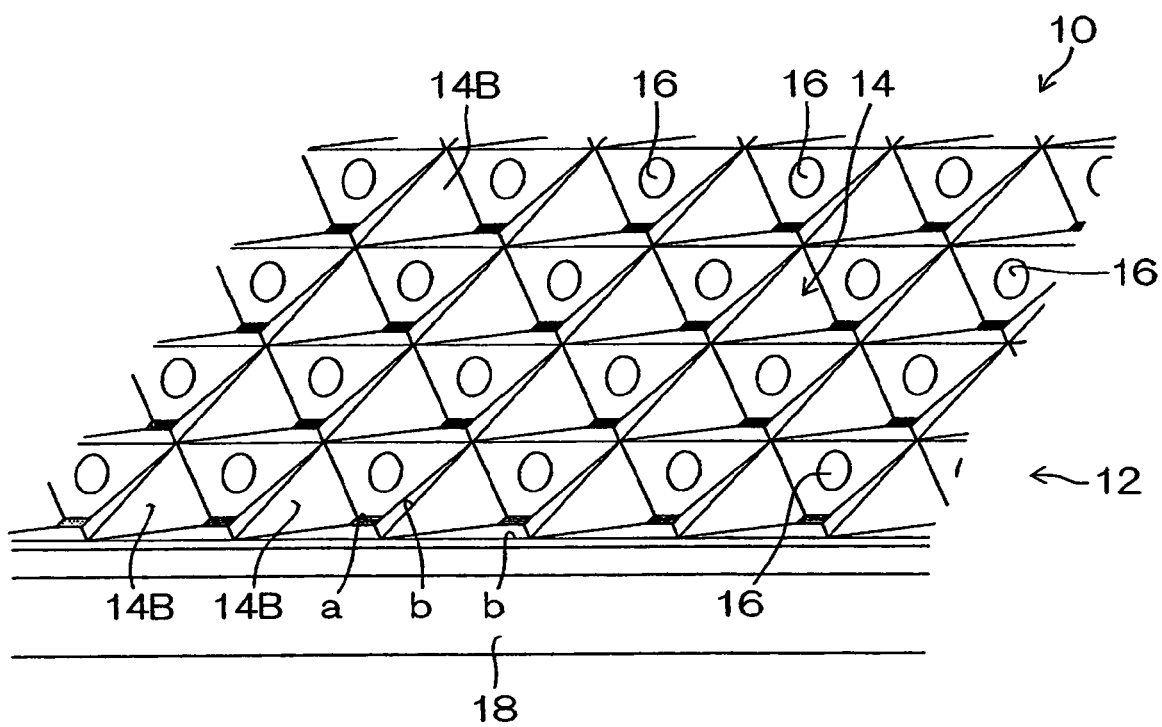
FIG. 11 shows a perspective view of an optical sheet in a fourth embodiment of the invention.

FIG. 11 shows an optical sheet 10 in a fourth embodiment of the invention. It is the same as the third embodiment in that the concave quadrangular pyramids 14B constitute the convex-concave patterns 14 to be formed over the transparent support 18, but the micro-dimples 16 are positioned in the slopes of the concave quadrangular pyramids 14B. This optical sheet 10 in the fourth embodiment can give a similar effect to the optical sheet in the first embodiment.

Though not shown, in the optical sheet 10 in the third or fourth embodiment, too, it is preferable to make at least one of the arraying, depth and pitch P of the concave quadrangular pyramids 14B to be made irregular (random). The arraying (longitudinal and lateral) of the concave quadrangular pyramids 14B here refers to the longitudinal and lateral lines linking the greatest depths a in FIG. 9.

Although one micro-dimple 16 is formed for one concave quadrangular pyramid 14B in the configurations shown in FIG. 9 to FIG. 11, a plurality of micro-dimples 16 may as well be formed for one concave quadrangular pyramid 14B or one micro-dimple 16 may be formed for a plurality of concave quadrangular pyramids 14B. Where a plurality of micro-dimples 16 are to be formed for one concave quadrangular pyramid 14B, they may be formed either in two or more of the four edge lines b of the top face of the concave quadrangular pyramid 14B or in both edge lines b and slopes. Although the micro-dimples 16 in FIG. 9 to FIG. 11 are semispherically shaped, there is no limitation to the shape of the micro-dimples 16. Further, the bore D and the depth d of the micro-dimples 16 need not be the same for all. Although the micro-dimples 16 are formed in the edge lines b in the lateral direction in FIG. 10 in the configuration shown in FIG. 10, they may as well be formed in the edge lines b in the longitudinal direction. Further, though the micro-dimples 16 are formed on the same side faces out of the four slopes constituting the concave quadrangular pyramids 14B in the configuration shown in FIG. 11, they may as well be formed in different faces.

Next, the manufacturing method and apparatus for the optical sheet 10 according to the present invention will be described with reference to the case of manufacturing the optical sheet 10 having the convex quadrangular pyramids 14A as the convex-concave patterns 14 described above with reference to FIG. 1 to FIG. 3.

Figure 12:
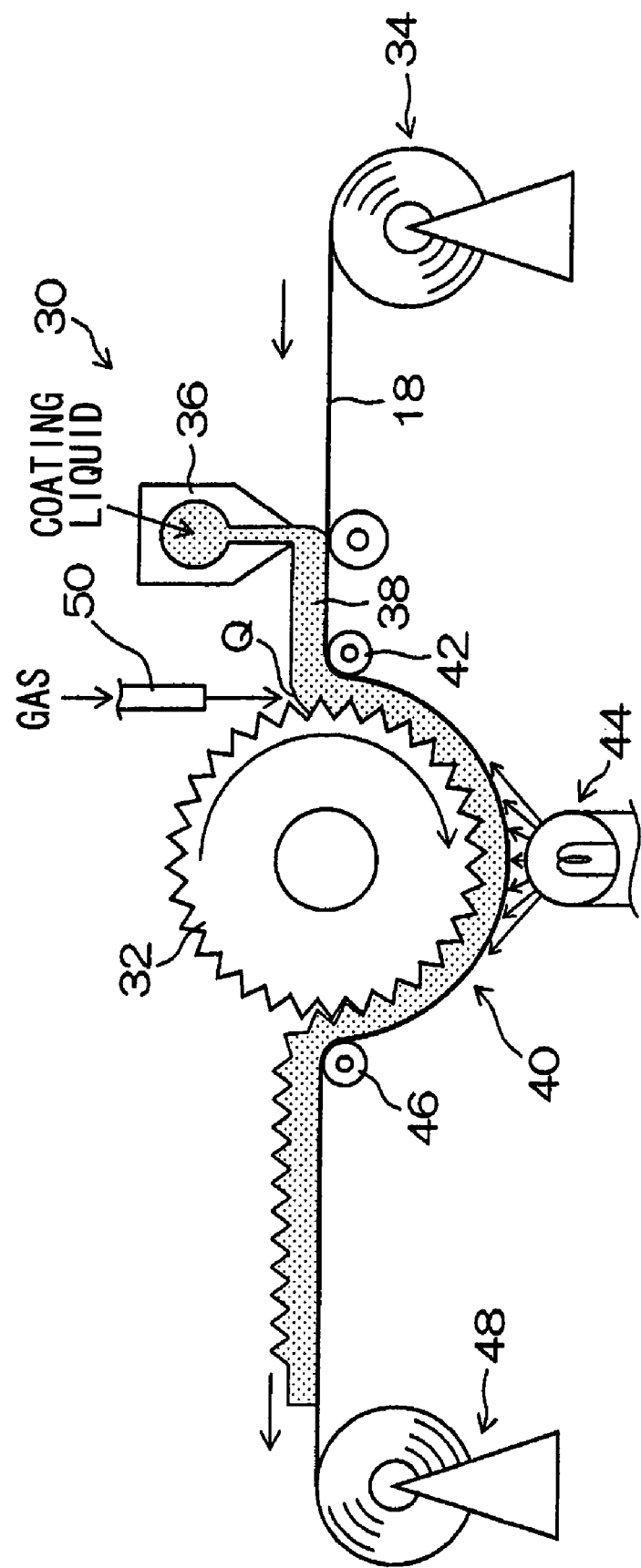
FIG. 12 is a schematic diagram showing the overall configuration of an optical sheet manufacturing apparatus according to the invention.

FIG. 12 is a schematic diagram showing the overall configuration of an optical sheet manufacturing apparatus 30 according to the invention. Incidentally, a zigzag-faced roller 32 is shown on a larger scale than other devices and members in FIG. 12 to emphasize the transferring part.

The web-form transparent support 18 is wound around a delivering device 34. The liquid of ultraviolet-curable (UV-curable) resin is applied by an application device 36 onto the transparent support 18 delivered to the production line from the delivering device 34. This causes a resin coat layer 38 to be formed on the transparent support 18 in a prescribed thickness. A preferable thickness of the resin coat layer 38 is, for instance, about 20 μm. Although an extrusion type dye coater is shown in FIG. 12 as the application device 36, this application system is not the only available one, but one or another of various other application devices can also be used.

Next, the transparent support 18 on which the resin coat layer 38 has been formed is carried to a curing device 40. In the curing device 40, the transparent support 18 is squeezed between the zigzag-faced roller 32 on whose surface the reversed pattern of the convex quadrangular pyramids 14A (concave quadrangular pyramids) is formed and a nip roller 42 to transfer the reversed pattern of the zigzag-faced roller 32 to the face of the resin coat layer 38 of the transparent support 18. An S45C roller whose surface material is hard chromium-coated copper, measuring, for instance, 700 mm in length (the widthwise direction of the transparent support 18) and 300 mm in diameter can be used as the zigzag-faced roller 32. The concave quadrangular pyramids resulting from the reversal can be formed all over the approximately 500 mm width of the roller surface by rolling with an ultra-hard mother mill. The nip roller 42 may preferably measure about 200 mm in diameter and have on its surface a layer of a silicon rubber of 90 in rubber hardness. The resin coat layer 38 is brought into contact with the zigzag-faced roller 32, and the transparent support 18 is pressed between the zigzag-faced roller 32 and the nip roller 42. It is preferable for the nip pressure (effective nip pressure) to be around 0.5 MPa. Then, in a state in which the transparent support 18 is wound around the zigzag-faced roller 32, the resin coat layer 38 is irradiated with ultraviolet rays by a UV irradiator 44. The convex quadrangular pyramids 14A transferred onto the face of the resin coat layer 38 are thereby cured. In order to cure the UV-curable resin of the resin coat layer 38, ultraviolet rays of about 1500 mJ/cm$^2$ in energy can be radiated from the transparent support 18 side. Next, transparent support 18 is peeled off the zigzag-faced roller 32 by a peeling roller 46 and taken up by a take-up device 48.

When the transparent support 18 is being wound around the zigzag-faced roller 32 in this way, gas is blown into the gap between the resin coat layer 38 and the surface of the zigzag-faced roller from a gas jet nozzle 50 arranged above the nip point Q between the zigzag-faced roller 32 and the nip roller 42. The gas used for this purpose is usually air, but any other non-hazardous such as nitrogen gas can be used. While blowing gas from the gas jet nozzle 50 into the gap between the resin coat layer 38 and the surface of the zigzag-faced roller in this way, the transparent support 18 is wound around the zigzag-faced roller 32. This causes most of the gas (including air) having accumulated in the concave quadrangular pyramids resulting from the reversal, formed in the zigzag-faced roller 32, to be excluded when the transparent support 18 is wound around the zigzag-faced roller 32, but the gas having accumulated in the deepest parts of the concave quadrangular pyramids remains unexcluded and is transferred. As a result, the micro-dimples 16 are formed at the vertexes of the convex quadrangular pyramids 14A transferred to the resin coat layer 38 (matching the deepest parts of the concave quadrangular pyramids resulting from the reversal). This enables the optical sheet 10 in the first embodiment described with reference to FIG. 1 to FIG. 3 to be manufactured.

If gas is jetted out from the gas jet nozzle 50 by using the zigzag-faced roller 32 on which the convex quadrangular pyramids resulting from the reversal are formed, the optical sheet 10 in which micro-dimples 16 are formed in the edge lines b of the concave quadrangular pyramids 14B can be manufactured as shown in FIG. 9 and FIG. 10.

Therefore, the optical sheet manufacturing apparatus according to the invention can provide an optical sheet 10 having both a light condensing function and a light diffusing function. Further, since the formation of the micro-dimples 16 can be accomplished together with the transfer of the convex-concave patterns 14 (the convex quadrangular pyramids 14A or the concave quadrangular pyramids 14B), the number of required steps can be reduced, and no special step or device is required for the formation of the micro-dimples 16. Also, since a single optical sheet has both a light condensing function and a light diffusing function, the film thickness can be made thinner than the conventional process of stacking a light condensing sheet and a light diffusing sheet.

While the foregoing description of the manufacturing method referred to a case in which a UV-curable resin was applied onto the transparent support 18, a thermosetting resin could be used as well, and in this case a heating device is provided in place of the UV irradiator 44. Further in the manufacturing apparatus shown in FIG. 12, the resin coat layer 38 applied onto the transparent support 18 is supposed to be carried as it is to the curing device 40, if the resin coat layer 38 contains a solvent, a drying device to let the solvent evaporate will be required between the application device 36 and the curing device 40.

Though not shown in FIG. 12, the optical sheet 10 according to the invention taken up by the take-up device 48 is rewound, fed to a cutting device to be cut into the appropriate product size for the intended liquid crystal optical element, and successively stacked in a stacking device. In this process, it is also acceptable to have the sheet cut as it is, instead of having it taken up by the take-up device 48, and to stack the cut pieces in the stacking device.

IMPLEMENTATION EXAMPLES

Next, implementation examples in which the optical sheet 10 was manufactured by using the manufacturing apparatus 30 shown in FIG. 12 will be described, but the implementation of the invention is not limited to the following examples.
(Transparent Support)
A transparent polyethylene terephthalate (PET) film of 500 mm in width and 100 μm in thickness was used.
(UV-curable Resins)
Resins of the Following Compositions were Used
EB3700: Ebecryl 3700, product of Daicel UC Co., Ltd.,
  Bisphenol A type epoxy acrylate,
  (Viscosity: 2200 mPa·S/65° C.)
BPE200: NK Ester BPE-200, product of Shin-Nakamura Chemical Co., Ltd.
  Ethylene oxide-added bisphenol A methacrylic acid ester
  (Viscosity: 590 mPa·s/25° C.)
BR-31: New Frontier BR-31, product of Dai-ichi Kogyo Seiyaku Co., Ltd.
  Tribromophenoxyethyl acrylate
  (solid at room temperature, m.p.$\geq$50° C.)

LR8893X: Lucirin LR8893X, photo radical generator product of BASF Japan, Ltd.

Ethyl-2, 4, 6-trimethyl benzoyl ethoxyphenyl phosphine oxide (Application Device)

An extrusion type dye coater was used to coat the transparent support with one or another of the above-listed UV-curable resins to a thickness of 20 μm.

(Transfer Device)

Zigzag-faced roller: An S45C roller whose surface material is hard chromium-coated copper, measuring 700 mm in length (the widthwise direction of the sheet W) and 300 mm in diameter, was used. The concave-convex patterns 14 resulting from the reversal, measuring 50 μm in pitch and 25 μm in height, were formed all over the approximately 500 mm width of the roller surface by rolling with an ultra-hard mother mill. The surface of the zigzag-faced roller was plated with hard chromium after the concave quadrangular pyramids were formed.

Nip roller: A roller measuring 200 mm in diameter and having on its surface a layer of a silicon rubber of 90 in rubber hardness was used. The nip pressure (effective nip pressure) of pressing the sheet W between the zigzag-faced roller and the nip roller was 0.5 MPa.

UV irradiator: Irradiation was carried out with energy of 1500 mJ/cm$^2$.

Peeling roller: A roller measuring 200 mm in diameter and having on its surface a layer of a silicon rubber of 90 in rubber hardness was used.

Gas jet nozzle: Air was jetted out at the same velocity as the line speed.

In Implementation Example 1, a zigzag-faced roller 32 having a shape resulting from the reversal of concave quadrangular pyramids was used, and an optical sheet 10 having one micro-dimple 16 at the vertex of each convex quadrangular pyramid 14A was manufactured (see FIG. 1 to FIG. 3).

In Implementation Example 2, a zigzag-faced roller 32 having a shape resulting from the reversal of convex quadrangular pyramids was used, and an optical sheet 10 having one micro-dimple 16 on the edge line b in the lateral direction of each concave quadrangular pyramid 14B was manufactured (see FIG. 9 and FIG. 10).

In Implementation Example 3, what was made irregular in the arraying of the reversed shape of the zigzag-faced roller 32 in Implementation Example 2 was manufactured to cause the edge lines b of both longitudinal and lateral rows of the concave quadrangular pyramids 14B of the optical sheet manufactured in Implementation Example 2 to meander.

In Implementation Example 4, what was made irregular in the height of the reversed shape of the zigzag-faced roller 32 in Implementation Example 2 was manufactured to cause the depths of the concave quadrangular pyramids 14B of the optical sheet manufactured in Implementation Example 2 to be random.

In Implementation Example 5, what was made irregular in the pitch P of the reversed shape of the zigzag-faced roller 32 in Implementation Example 2 was manufactured to cause the pitch P of the concave quadrangular pyramids 14B of the optical sheet manufactured in Implementation Example 2 to be random.

[Performance Tests of Optical Sheets]

The optical performances of the optical sheets 10 in Implementation Examples 1 to 5 above were tested in four aspects including front luminance (light condensation), light diffusion, sidelobes and optical interference fringes. As references to compare with, prism sheets of Company A's product 1 and the same manufacturer's product 2 were used, both conventionally available items.

The results are listed in the table of FIG. 13. The front luminance (light condensation), light diffusion, sidelobes and optical interference fringes in the table of FIG. 13 are assessed in terms of comparison between Implementation Examples 1 to 5 with Company A's products 1 and 2.

As is seen from the table of FIG. 13, in front luminance, Company A's product 1 was the highest and its product 2 was the lowest. Every one of the optical sheets 10 in Implementation Examples 1 to 5 of the invention was positioned between Company A's products 1 and 2, but their light condensing function (in terms of front luminance) was fully satisfactory for optical sheets to be used in liquid crystal optical elements.

In light diffusion, every one of the optical sheets 10 in Implementation Examples 1 to 5 of the invention was found evidently superior to Company A's products 1 and 2, manifesting a fully satisfactory light diffusing function for optical sheet to be used in liquid crystal optical elements.

As hitherto described, none of the optical sheets in Implementation Examples 1 to 5 of the invention proved inferior in front luminance to Company A's products 1 and 2 (prism sheets) when micro-dimples were formed in the convex-concave face of the convex-concave patterns 14. The optical sheets in Implementation Examples 1 to 5 of the invention proved significantly superior to Company A's products 1 and 2 (prism sheets) in light diffusion by virtue of the formation of micro-dimples. Incidentally, Company A's products 1 and 2 (prism sheets) allow the back light lamp to become visible unless combined with a light diffusing sheet.

Regarding sidelobes, Company A's product 1 was found most conspicuous in this respect, which means an undesirable result, but the optical sheets 10 in Implementation Examples 1 to 5 of the invention and Company A's product 2 were inconspicuous and therefore satisfactory.

In respect of optical interference fringes, Company A's products 1 and 2 vividly expressed this phenomenon. Unlike them, the optical sheets 10 in Implementation Examples 1 to 5 of the invention expressed little or no optical interference fringes, and therefore were found satisfactory. Especially, the optical sheets in Implementation Examples 3 to 5 were completely free from optical interference fringes. Though not mentioned in the table, absolutely no optical interference fringes occurred where at least one of the arraying, height and pitch P of the convex quadrangular pyramids 14A in Implementation Example 1 was made irregular (random).

Thus, the optical sheet 10 according to the invention can have both a light condensing function and a light diffusing function in a single sheet. Especially, where at least one of the arraying, depth (height) and pitch P of the concave quadrangular pyramids 14B (or the convex quadrangular pyramids 14A) of the optical sheet 10 according to the invention is made irregular (random), optical interference fringes can be completely prevented from occurring.

The invention claimed is:

1. A method for manufacturing an optical sheet having both a light condensing function and a light diffusing function, the optical sheet comprising, on an entire surface thereof, minute convex-concave patterns including micro-dimples at vertices of convex quadrangular pyramids or in edge lines of concave quadrangular pyramids, the method comprising:

a liquid application step of consecutively applying a liquid of curable resin onto a web-form transparent support which is being carried to form a resin coat layer;

a transfer step of winding the transparent support on which the resin coat layer is formed around a rotating zigzag-faced roller thereby to transfer convex-concave patterns on the surface of the zigzag-faced roller onto the resin coat layer;

a curing step of curing, in a state in which the transparent support is wound around the zigzag-faced roller, the resin coat layer to which the convex-concave patterns have been transferred;

a peeling step of peeling the transparent support having the resin coat layer off the zigzag-faced roller; and a blow-in step of forming micro-dimples on the surface of the convex-concave patterns on the resin coat layer while being transferred by the transfer step, by blowing gas, immediately before winding the transparent support around the zigzag-faced roller, into a gap between the resin coat layer and the surface of the zigzag-faced roller.

2. The method of manufacturing an optical sheet according to claim 1, wherein the micro-dimples are 1 to 10 μm in bore and 1 to 10 μm in depth.

* * * * *